US008266890B2

(12) United States Patent
Singh

(10) Patent No.: US 8,266,890 B2
(45) Date of Patent: Sep. 18, 2012

(54) PREVENTING SOOT UNDERESTIMATION IN DIESEL PARTICULATE FILTERS BY DETERMINING THE RESTRICTION SENSITIVITY OF SOOT

(75) Inventor: Nishant Singh, Bensenville, IL (US)

(73) Assignee: International Engine Intellectual Property Company, LLC, Lisle, IL (US)

( * ) Notice: Subject to any disclaimer, the term of this patent is extended or adjusted under 35 U.S.C. 154(b) by 535 days.

(21) Appl. No.: 12/481,781

(22) Filed: Jun. 10, 2009

(65) Prior Publication Data

US 2010/0313629 A1 Dec. 16, 2010

(51) Int. Cl.
*F01N 3/00* (2006.01)

(52) U.S. Cl. ............................................. 60/274; 60/295

(58) Field of Classification Search ................. 73/23.31, 73/23.33; 60/274, 295, 297
See application file for complete search history.

(56) References Cited

U.S. PATENT DOCUMENTS

| | | | |
|---|---|---|---|
| 5,020,361 A | 6/1991 | Malecki | |
| 5,058,424 A | 10/1991 | O'Hara | |
| 5,367,778 A | 11/1994 | O'Hara | |
| 5,449,956 A | 9/1995 | Williams | |
| 5,844,769 A | 12/1998 | Maier | |
| 5,936,154 A | 8/1999 | Neely | |
| 5,988,134 A | 11/1999 | Smietanski | |
| 6,052,896 A | 4/2000 | Howell, III | |
| 6,053,043 A | 4/2000 | Dannenberg | |
| 6,055,853 A | 5/2000 | Roberts | |
| 6,099,063 A | 8/2000 | Rohatgi | |
| 6,174,219 B1 | 1/2001 | Mathews | |
| 6,188,948 B1 | 2/2001 | Shivler, Jr. | |
| 6,260,914 B1 | 7/2001 | Nieminski | |
| 6,263,269 B1 | 7/2001 | Dannenberg | |
| 6,272,402 B1 | 8/2001 | Kelwaski | |
| 6,272,904 B1 | 8/2001 | Neelly, Jr. | |
| 6,286,638 B1 | 9/2001 | Rowan | |
| 6,356,822 B1 | 3/2002 | Diaz | |
| 6,378,167 B1 | 4/2002 | Howell, III | |
| 6,378,640 B1 | 4/2002 | Dewey | |
| 6,401,700 B2 | 6/2002 | Balekai | |
| 6,418,913 B1 | 7/2002 | Schmidt | |
| 6,431,304 B1 | 8/2002 | Smythe | |
| 6,435,259 B1 | 8/2002 | Baker | |

(Continued)

FOREIGN PATENT DOCUMENTS

WO 00/26883 A2 5/2000

(Continued)

*Primary Examiner* — Lisa Caputo
*Assistant Examiner* — Punam Roy
(74) *Attorney, Agent, or Firm* — Mark C. Bach; Jeffrey P. Calfa

(57) ABSTRACT

A method of determining a need to perform regeneration of a diesel particulate filter in a diesel engine exhaust predicts a soot load of a diesel particulate filter with a pressure change based soot load estimate based upon a pressure change across the diesel particulate filter at a first time and a second time. A restriction sensitivity for the diesel particulate filter is calculated based upon the pressure change across the diesel particulate filter at the first time and the second time. The method transitions from the pressure change based soot load estimate to a model based soot accumulation estimate of the soot load of the diesel particulate filter upon the restriction sensitivity falling below a predetermined threshold. Regeneration of the diesel particulate filter is requested after the estimated soot level reaches a preset level based upon the soot accumulation model.

24 Claims, 1 Drawing Sheet

U.S. PATENT DOCUMENTS

| | | |
|---|---|---|
| 6,463,818 B1 | 10/2002 | Stagg |
| 6,467,457 B1 | 10/2002 | Lei |
| 6,513,367 B2 | 2/2003 | Bondarowicz |
| 6,513,368 B2 * | 2/2003 | Bondarowicz et al. ...... 73/53.05 |
| 6,547,020 B2 | 4/2003 | Maus |
| 6,554,232 B1 | 4/2003 | Macris |
| 6,561,164 B1 | 5/2003 | Mollin |
| 6,601,561 B1 | 8/2003 | Liu |
| 6,604,507 B1 | 8/2003 | Lei |
| 6,626,256 B2 | 9/2003 | Dennison |
| 6,684,853 B1 | 2/2004 | Lei |
| 6,738,701 B2 | 5/2004 | Wilson |
| 6,742,386 B1 | 6/2004 | Larson |
| 6,761,059 B2 | 7/2004 | Hsia |
| 6,865,806 B2 | 3/2005 | Wildrick |
| 6,993,428 B1 | 1/2006 | Gundrum |
| 7,032,578 B2 | 4/2006 | Liu |
| 7,066,016 B2 | 6/2006 | Wildman |
| 7,096,724 B2 | 8/2006 | Wildman |
| 7,104,148 B2 | 9/2006 | Baker |
| 7,121,255 B2 | 10/2006 | Liu |
| 7,124,628 B2 | 10/2006 | Wildman |
| 7,168,304 B2 | 1/2007 | Beaucaire |
| 7,171,957 B2 | 2/2007 | Liu |
| 7,184,877 B1 | 2/2007 | de Ojeda |
| 7,197,918 B2 | 4/2007 | Shen |
| 7,201,147 B2 | 4/2007 | Bernhardt |
| 7,257,885 B2 | 8/2007 | Watkins |
| 7,293,358 B2 | 11/2007 | Wildrick |
| 7,349,798 B2 | 3/2008 | Beyene |
| 7,380,445 B2 | 6/2008 | Wood |
| 7,500,358 B2 * | 3/2009 | Singh et al. ............ 60/295 |
| 7,562,524 B2 * | 7/2009 | Wills ............... 60/297 |
| 8,051,645 B2 * | 11/2011 | Chamarthi et al. ............ 60/295 |
| 8,069,658 B2 * | 12/2011 | He et al. ............ 60/295 |
| 8,161,738 B2 * | 4/2012 | He et al. ............ 60/296 |
| 2002/0174854 A1 | 11/2002 | Lei |
| 2003/0141380 A1 | 7/2003 | Liu |
| 2004/0237921 A1 | 12/2004 | de Ojeda |
| 2005/0034514 A1 | 2/2005 | Shen |
| 2005/0044705 A1 | 3/2005 | Watkins |
| 2005/0092074 A1 | 5/2005 | Beaucaire |
| 2005/0217355 A1 | 10/2005 | Wildman |
| 2005/0217358 A1 | 10/2005 | Wildman |
| 2005/0217359 A1 | 10/2005 | Wildman |
| 2005/0257521 A1 | 11/2005 | Anello |
| 2006/0060172 A1 | 3/2006 | Liu |
| 2006/0070427 A1 | 4/2006 | Baker |
| 2006/0200297 A1 | 9/2006 | Liu |
| 2006/0207581 A1 | 9/2006 | Minetto |
| 2006/0244626 A1 | 11/2006 | Beyene |
| 2007/0044547 A1 | 3/2007 | Zhang |
| 2007/0056273 A1 * | 3/2007 | Wills ............... 60/297 |
| 2007/0199320 A1 | 8/2007 | Yager |
| 2007/0234711 A1 | 10/2007 | Berke |
| 2007/0271906 A1 | 11/2007 | Berke |
| 2008/0011070 A1 | 1/2008 | Wood |
| 2008/0034738 A1 * | 2/2008 | Singh et al. ............ 60/295 |
| 2008/0047336 A1 | 2/2008 | Cox |
| 2009/0151330 A1 * | 6/2009 | Chamarthi et al. ............ 60/286 |
| 2009/0308052 A1 * | 12/2009 | Zhang et al. ............ 60/274 |
| 2010/0089041 A1 * | 4/2010 | Tai et al. ............ 60/287 |
| 2010/0126144 A1 * | 5/2010 | He et al. ............ 60/286 |
| 2010/0126145 A1 * | 5/2010 | He et al. ............ 60/286 |
| 2011/0162352 A1 * | 7/2011 | Svensson et al. ............ 60/297 |
| 2011/0209460 A1 * | 9/2011 | He et al. ............ 60/274 |
| 2012/0004863 A1 * | 1/2012 | Ardanese et al. ............ 702/47 |
| 2012/0031080 A1 * | 2/2012 | Barasa ............ 60/285 |
| 2012/0053814 A1 * | 3/2012 | George et al. ............ 701/102 |

FOREIGN PATENT DOCUMENTS

| | | |
|---|---|---|
| WO | 00/38953 A1 | 7/2000 |
| WO | 00/71407 A1 | 11/2000 |
| WO | 01/05629 A1 | 1/2001 |
| WO | 01/42639 A2 | 6/2001 |
| WO | 01/59275 A2 | 8/2001 |
| WO | 01/82519 A2 | 11/2001 |
| WO | 02/092986 A1 | 11/2002 |
| WO | 03/106819 A1 | 12/2003 |
| WO | 2004/015248 A1 | 2/2004 |
| WO | 2006/009693 A2 | 1/2006 |
| WO | 2006/099520 A2 | 9/2006 |
| WO | 2007/040904 A1 | 4/2007 |
| WO | 2007/103790 A2 | 9/2007 |
| WO | 2007/103801 A2 | 9/2007 |

* cited by examiner

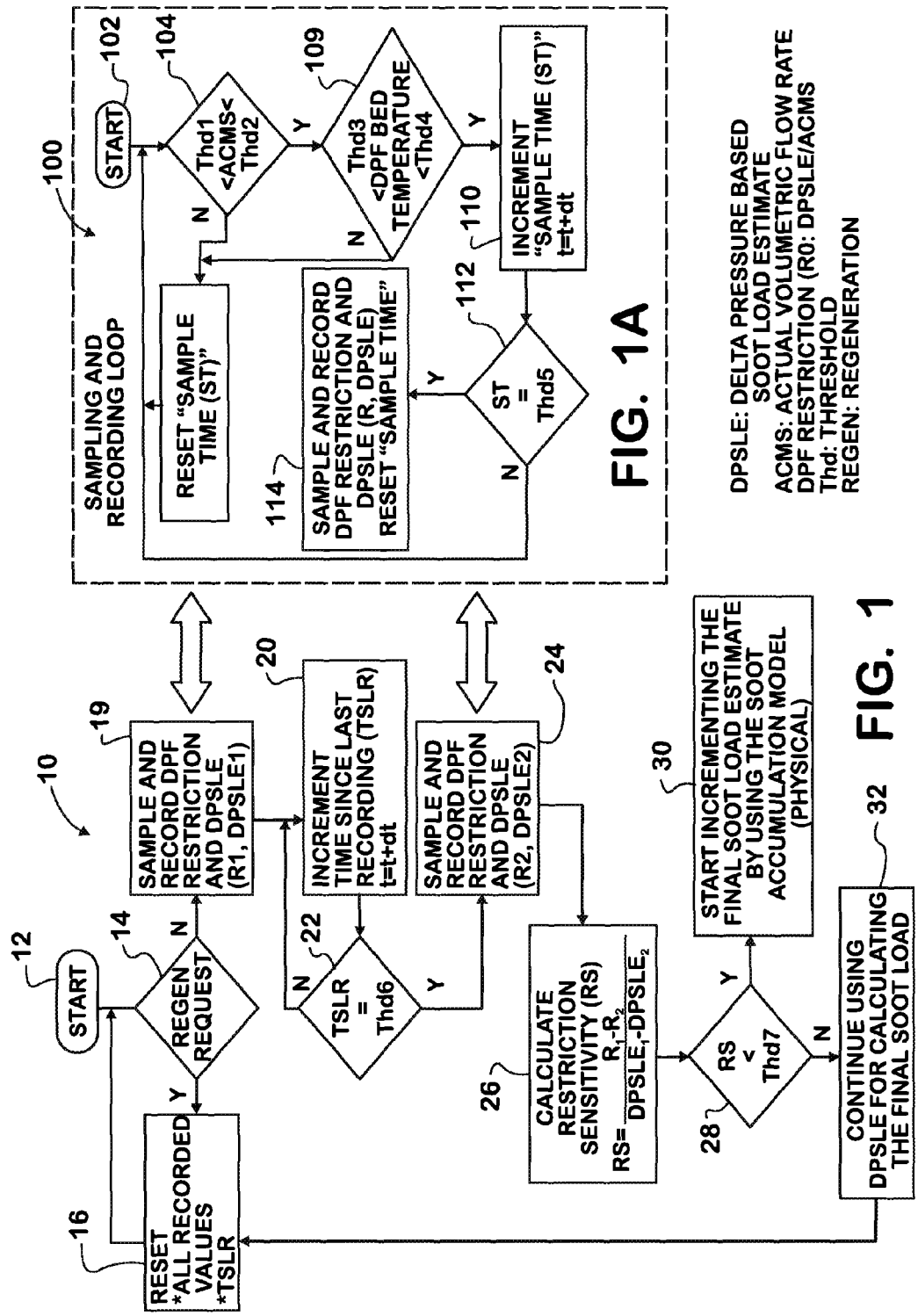

PREVENTING SOOT UNDERESTIMATION IN DIESEL PARTICULATE FILTERS BY DETERMINING THE RESTRICTION SENSITIVITY OF SOOT

TECHNICAL FIELD

The present patent relates to engine exhaust particulate filters, and more particularly to methods for estimating the soot levels of a particulate filter in the exhaust of a diesel engine.

BACKGROUND OF THE INVENTION

Many factors including environmental responsibility and modern environmental regulations on engine exhaust emissions have reduced allowable acceptable levels of certain pollutants that may enter the atmosphere following the combustion of fossil fuels. Increasingly more stringent emission standards require greater control over both the combustion of fuel within the engine, and may require post combustion treatment of the exhaust. For example, the allowable levels of nitrogen oxides (NOX) and particulate matter have been greatly reduced over the last several years. To address, among other issues, environmental concerns, many diesel engines now have an exhaust particulate filter within an exhaust system of the engine purposed to reduce the amount of particulate matter released into the atmosphere.

In order to increase the service life of the exhaust particulate filter, an engine may be instructed by an engine control module to perform a regeneration cycle for the exhaust particulate filter that causes exhaust gas temperatures to rise to a level to regenerate the exhaust particulate filter by burning the trapped particulate matter. The regeneration cycle increases the fuel usage of the engine. Thus, it is important to accurately estimate how much particulate matter is within the exhaust gas particulate filter, also referred to as the soot load of the exhaust particulate filter, to prevent premature regeneration of the particulate filter and the increased fuel usage that accompanies the regeneration.

SUMMARY OF THE INVENTION

According to one process, a method estimates a soot level within an exhaust gas particulate filter. The method generates a pressure change based soot load estimate within the exhaust gas particulate filter at the first time based upon a pressure change from the input to the output of an exhaust gas particulate filter. A pressure change based soot load estimate within the exhaust gas particulate filter at a second time is generated based upon the pressure change from the input to the output of an exhaust gas particulate filter. The method calculates a restriction sensitivity of the exhaust gas particulate filter utilizing restriction amounts within the exhaust gas particulate filter and the soot load estimates within the exhaust gas particulate filter at the first time and the second time. A model based soot load estimate for the exhaust gas particulate filter is selected when the restriction sensitivity falls below a predetermined threshold.

According to another process, a method determines a need to perform regeneration of a diesel particulate filter in a diesel engine exhaust. The method predicts a soot load of a diesel particulate filter with a pressure change based soot load estimate based upon a pressure change across the diesel particulate filter at a first time and a second time. A restriction sensitivity for the diesel particulate filter is calculated based upon the pressure change across the diesel particulate filter at the first time and the second time. The method transitions from the pressure change based soot load estimate to a model based soot accumulation estimate of the soot load of the diesel particulate filter upon the restriction sensitivity falling below a predetermined threshold. Regeneration of the diesel particulate filter is requested after the estimated soot level reaches a preset level based upon the soot accumulation model.

According to a further process, a method selects a soot estimation model for a diesel particulate filter. The method monitors a volumetric flow rate of engine exhaust. Temperature information of the diesel particulate filter is obtained. The method measures a pressure change from an input to an output of the diesel particulate filter at a first time. A pressure change based soot load estimate within the diesel particulate filter at the first time is generated based upon the pressure change from the input to the output of an exhaust gas particulate filter. The method compares the pressure change based soot load estimate at the first time to a predetermined threshold. A model based soot load estimate for the diesel particulate filter is selected when the pressure change based soot load estimate at the first time is above a predetermined threshold. The method measures a pressure change from an input to an output of the diesel particulate filter at a second time. A pressure change based soot load estimate within the diesel particulate filter is generated at the second time based upon the pressure change from the input to the output of an exhaust gas particulate filter. The method calculates a restriction sensitivity for the diesel particulate filter utilizing the pressure change across the diesel particulate filter at the first time and a second time and the pressure change based soot load estimates within the diesel particulate filter at the first time and the second time. A model based soot load estimate for the diesel particulate filter is selected when the restriction sensitivity is below a preset threshold.

According to one embodiment, an exhaust gas particulate filter comprises an input, an output, a filtering element; and at least one measurement node. The at least one measurement node obtains an input measurement indicative of a pressure change from the input to the output of the exhaust gas particulate filter.

Other features the processes will be apparent from the following specification taken in conjunction with the following drawings.

BRIEF DESCRIPTION OF THE DRAWINGS

To understand the present invention, it will now be described by way of example, with reference to the accompanying drawings in which:

FIG. 1 is a flow diagram depicting a method of selecting a model of estimating a soot load of an exhaust gas particulate filter according to one process; and FIG. 1a is a flow diagram depicting a sampling and recording sub-loop utilized with the method of selecting a model of estimating a soot load of an exhaust gas particulate filter.

DETAILED DESCRIPTION

While this process is susceptible of being performed in many different forms, there is shown in the drawings and will herein be described in detail certain processes of the method with the understanding that the present disclosure is to be considered as an exemplification of the principles of the process and is not intended to limit the broad aspect of the method to the process illustrated.

According to one process as shown in FIG. 1, a method 10 of selecting a manner of estimating a soot load of an exhaust gas particulate filter is shown. The method is implemented by the electronic control module (ECM) of the engine. The process begins at block 12 and next determines whether a request for regeneration has been requested at block 14. If regeneration has been requested, the process resets stored data and returns to the beginning of the process 10. If no request for regeneration is detected at block 14, the process initiates a sample and recording sub-loop 100 (FIG. 1a) at block 18. The sampling and recording sub-loop 100 is shown in additional detail in FIG. 1a.

As shown in FIG. 1a, the sampling and recording sub-loop 100 is initiated at block 102 and determines if a volumetric flow rate value of engine exhaust is between two predetermined threshold values, as shown at block 104. The volumetric flow rate value is the amount of exhaust gas leaving the engine at a particular time. If the volumetric flow rate of exhaust is not between the threshold values, the sampling and recording sub-loop resets a sample time, at block 106, and reinitiates the sampling and record sub-loop 100. If the volumetric flow rate of engine exhaust is between the thresholds, the process next determines if the exhaust gas particulate filter temperature is between two predetermined threshold temperatures, shown at block 108. If the exhaust gas particulate filter temperature is not between the two threshold temperatures, the sample time is rest as shown at block 106. If the exhaust gas particulate filter temperature is between the threshold temperatures, the process increments a sample time by adding an amount of time that has transpired since the last sample, shown at block 110. Ensuring that the volumetric flow rate of engine exhaust and the exhaust particulate filter temperature are between threshold levels reduces the effect of transient operations of the engine, such as initial loading of the engine, or a situation where the engine is idling, or undergoing acceleration, that can produce inaccurate indications of the soot load of the exhaust gas particulate filter.

The process next determines if the sample time is a predetermined time at block 112. If the sample time is not a predetermined time, the process reinitiates the sampling and recording sub-loop 100. If the sample time is the predetermined time, the process samples and records a restriction level of the exhaust gas particulate filter (R) and calculates and records a pressure change based soot load estimate for a soot load within the particulate filter (DPSLE) at block 114.

The restriction level of the exhaust gas particulate filter is calculated according to the following formula:

$$R = \frac{\Delta P \text{ of Exhaust Gas Particulate Filter}}{\text{Volumetric Flow Rate of Engine Exhaust}}$$

Where ΔP of Exhaust Gas Particulate Filter is the pressure change from the input to the output of the exhaust gas particulate filter.

The pressure change based soot load estimate for the soot load within the particulate filter is estimated based on the change in pressure between the input of the exhaust gas particulate filter and the output of the exhaust gas particulate filter. A greater amount of soot within the exhaust gas particulate filter will create a larger pressure change through the exhaust gas particulate filter.

Turning back to FIG. 1, once the restriction level of the exhaust gas particulate filter has been measured and the pressure change based soot load estimate has been generated, the process increments a time since last recording by adding the time that has passed since the last sample was recorded, as shown in block 20. Next, the process determines if the amount of time since last recording is equal to a predetermined time period, as shown at block 22. If the time since last recording does not equal the predetermined time period, the process continues to increment the amount of time since last recording as shown at block 20. If the time since last recording is equal to the predetermined time period, a second sample and recording sub-loop 100 is performed, as shown at block 24, and is identical to the process shown in FIG. 1a and described above.

Once the second sample and recording sub-loop 100 is preformed, the process calculates a restriction sensitivity (RS) for the exhaust gas particulate filter as shown at block 26. The restriction sensitivity is calculated using the following formula:

$$RS = \frac{R_1 - R_2}{DPSLE_1 - DPSLE_2}$$

where $R_1$ is the restriction level of the exhaust gas particulate filter recorded from block 18 at a first time, and $R_2$ is the restriction level of the exhaust gas particulate filter recorded from block 24 at a second time. Similarly, $DPSLE_1$ is the pressure change based soot load estimate generated at block 18 at the first time, and $DPSLE_2$ is the pressure change based soot load estimate generated at block 24 at the second time.

The restriction sensitivity is compared to a stored restriction sensitivity threshold level at block 28. If the restriction sensitivity is below the stored restriction sensitivity threshold level, a model based soot load estimate is initiated, as shown at block 30. The model based soot load estimate is used to determine when regeneration of the exhaust gas particulate filter is required. Once the model based soot load estimate is initiated, regeneration of the exhaust gas particulate filter will occur based once the model based soot load estimate indicates that the particulate filter is reaching capacity and requires regeneration. As the model based soot load estimate is contained within the electronic control module, the electronic control module will initiate the regeneration as indicated by the model based soot load estimate.

However, if the restriction sensitivity is above the stored restriction sensitivity threshold level, the pressure change based soot load estimate is continued, shown at block 32, and the process resets the recorded values and restarts the process 10 as shown at block 16.

The restriction sensitivity is utilized to select the model used to estimate the soot load of the exhaust particulate filter in order to more accurately indicate when regeneration is required. A model based soot load estimate may be created using data generated from physical testing of the exhaust particulate filter under various conditions so that an accurate representation of the amount of soot within the filter is predicted. The model based soot load estimate is only utilized once the restriction sensitivity falls below a certain level, therefore, the model based soot load estimate may be optimized for soot loads above a predetermined value. As the model based soot load estimate does not have to cover all levels of soot loading within the filter, the model based soot load estimate may provide accurate soot load estimates above a predetermined soot load, helping to prevent premature regeneration of the exhaust gas particulate filter.

The pressure change based soot load estimate similarly may be tailored to soot loadings below a certain estimated soot load level. The pressure change based soot load estimate is calculated and monitored continuously, therefore, the electronic control module may switch to the model based soot load estimate at any time it is determined that the restriction sensitivity is below the threshold level. This process prevents unnecessary regenerations of the exhaust gas particulate filter, while also ensuring that the exhaust gas particulate filter operates effectively throughout its lifecycle without compromising the emissions released into the atmosphere or shortening the service life of the filter.

The above process has been described in connection with an engine, more specifically a diesel engine, but is adapted to be used on many combustion process, such as electricity generating stations that utilize fossil fuels to generate electricity, manufacturing plant furnaces, building boilers, heating oil furnaces, and other sources of particulate matter from combustion of fossil fuels.

While the specific embodiments have been illustrated and described, numerous modifications come to mind without significantly departing from the spirit of the invention, and the scope of protection is only limited by the scope of the accompanying Claims.

What is claimed is:

1. A method of using an Electronic Control Module (ECM) in an Internal Combustion Engine for estimating a soot level within an exhaust gas particulate filter having an input and an output comprising:
    generating within the ECM a first soot load estimate within the exhaust gas particulate filter at a first time based upon a first pressure change from the input to the output of the exhaust gas particulate filter;
    generating a second soot load estimate within the exhaust gas particulate filter at a second time based upon a second pressure change from the input to the output of the exhaust gas particulate filter;
    calculating within the ECM a restriction sensitivity of the exhaust gas particulate filter utilizing a first restriction amount within the exhaust gas particulate filter at the first time, a second restriction amount at the second time, and the first and second soot load estimates within the exhaust gas particulate filter at the first and second times; and
    selecting within the ECM a model based soot load estimate for the exhaust gas particulate filter when the restriction sensitivity falls below a predetermined threshold.

2. The method of claim 1 further comprising:
    detecting a first temperature of the exhaust gas particulate filter before determining the first restriction amount within the exhaust gas particulate filter at the first time; and
    resetting with the ECM the first soot load estimate within the exhaust gas particulate filter if the first temperature is outside of a predetermined range of temperatures.

3. The method of claim 1 further comprising:
    detecting a second temperature of the exhaust gas particulate filter before determining the second restriction amount within the exhaust gas particulate filter at the second time; and
    allowing within the ECM a time $T_2+T_n$ to pass if the second temperature at the second time is outside of a predetermined range of temperatures,
    wherein $T_2$ is the second time and $T_n$ is another time.

4. The method of claim 1 further comprising:
    continuing use within the ECM of either the first soot load estimate or the second soot load estimate based on pressure change when the restriction sensitivity remains above the predetermined threshold.

5. The method of claim 1 further comprising:
    comparing within the ECM the first volumetric flow rate of exhaust gas at the first time to a lower threshold value and an upper threshold value; and
    resetting within the ECM the first soot load estimate within the exhaust gas particulate filter if the first volumetric flow rate value is not between the lower threshold value and the upper threshold value.

6. The method of claim 1, wherein the restriction sensitivity is determined within the ECM using:

$$RS = \frac{R_1 - R_2}{DPSLE_1 - DPSLE_2}$$

wherein $R_1$ is restriction within the exhaust gas particulate filter at the first time, $R_2$ is restriction within the exhaust gas particulate filter at the second time, $DPSLE_1$ is the first pressure soot load estimate at the first time, and $DPSLE_2$ is the second soot load estimate at the second time.

7. The method of claim 1, wherein restriction within the exhaust gas particulate filter is determined within the ECM using:

$$R = \frac{\Delta P \text{ of Exhaust Gas Particulate Filter}}{\text{Volumetric Flow Rate of Engine Exhaust}}$$

wherein $\Delta P$ of Exhaust Gas Particulate Filter is pressure change from the input to the output of the exhaust gas particulate filter.

8. The method of claim 1, wherein the restriction sensitivity is determined by a ratio of the difference between the restriction at the first time and the restriction at the second time, and the difference between the soot load estimate based on pressure at the first time and the soot load estimate based on pressure at the second time.

9. The method of claim 1, wherein restriction within the exhaust gas particulate filter is determined by a ratio of pressure change from the input to the output of the exhaust gas particulate filter and volumetric flow rate of engine exhaust.

10. A method of using an Electronic Control Module (ECM) in an Internal Combustion Engine for estimating a soot level within an exhaust gas particulate filter having an input and an output, the method comprising:
    measuring a first pressure change from the input to the output of the exhaust gas particulate filter at a first time;
    identifying a first volumetric flow rate of exhaust gas at the first time;
    generating within the ECM a first soot load estimate within the exhaust gas particulate filter at the first time based upon the measured first pressure change;
    determining within the ECM a first restriction amount within the exhaust gas particulate filter at the first time utilizing the measured first pressure change and the identified first volumetric flow rate of the exhaust gas;
    measuring a second pressure change from the input to the output of the exhaust gas particulate filter at a second time;
    identifying a second volumetric flow rate of exhaust gas at the second time;
    generating a second soot load estimate within the exhaust gas particulate filter at a second time based upon the measured second pressure change;

determining within the ECM a second restriction amount within the exhaust gas particulate filter at the second time utilizing the measured second pressure change and the identified second volumetric flow rate of the exhaust gas;

calculating within the ECM a restriction sensitivity of the exhaust gas particulate filter utilizing the first and second restriction amounts and the first and second soot load estimates; and selecting within the ECM a model based soot load estimate for the exhaust gas particulate filter when the restriction sensitivity falls below a predetermined threshold.

11. A method of using an Electronic Control Module (ECM) attached to an Internal Combustion Engine for determining a need to perform regeneration of a diesel particulate filter in a diesel engine exhaust comprising:

predicting within the ECM a soot load of a diesel particulate filter with a soot load estimate based upon the pressure change across the diesel particulate filter at the first time and at the second time;

calculating within the ECM a restriction sensitivity for the diesel particulate filter based upon pressure change across the diesel particulate filter at the first time and at the second time; and transitioning within the ECM from the soot load estimate based on pressure to a model based soot accumulation estimate upon the restriction sensitivity falling below a predetermined threshold.

12. The method of claim 11 further comprising:
requesting within the ECM regeneration of the diesel particulate filter after estimated soot level reaches a preset level based upon the model based soot accumulation estimate.

13. The method of claim 11, wherein the restriction sensitivity is determined within the ECM using:

$$RS = \frac{R_1 - R_2}{DPSLE_1 - DPSLE_2}$$

wherein: $R_1$ is the first restriction within the diesel particulate filter at the first time, $R_2$ is the restriction within the diesel particulate filter at the second time, $DPSLE_1$ is the pressure change based soot load estimate at the first time, and $DPSLE_2$ is the soot load estimate at the second time.

14. The method of claim 11, wherein the restriction within the diesel particulate filter is determined within the ECM using:

$$R = \frac{\Delta P \text{ of Exhaust Gas Particulate Filter}}{\text{Volumetric Flow Rate of Engine Exhaust}}$$

wherein ΔP of Exhaust Gas Particulate Filter is pressure change from the input to the output of the exhaust diesel particulate filter.

15. The method of claim 11, wherein the restriction sensitivity is determined by a ratio of difference between restriction at the first time and restriction at the second time, and difference between the first soot load estimate and the second soot load estimate based on pressure at the second time.

16. The method of claim 11, wherein restriction within the diesel particulate filter is determined by a ratio of pressure change from the input to the output of the diesel particulate filter and volumetric flow rate of engine exhaust.

17. A method of using an Electronic Control Module (ECM) in an Internal Combustion Engine for selecting a soot estimation model for a diesel particulate filter comprising:

monitoring a volumetric flow rate of engine exhaust;

obtaining temperature of the diesel particulate filter;

measuring a first pressure change from an input to an output of the diesel particulate filter at a first time;

generating within the ECM a first soot load estimate within the diesel particulate filter at the first time based upon pressure change from the input to the output of the exhaust gas particulate filter;

comparing within the ECM the first soot load estimate at the first time to a predetermined threshold;

selecting within the ECM a first model based soot load estimate for the diesel particulate filter when the first soot load estimate is above the predetermined threshold;

measuring a second pressure change from an input to an output of the diesel particulate filter at a second time;

generating within the ECM a second soot load estimate within the diesel particulate filter at the second time based upon the second pressure change from the input to the output of the diesel particulate filter;

calculating within the ECM a restriction sensitivity for the diesel particulate filter utilizing the first soot load estimate and the second soot load estimate;

selecting within the ECM a model based soot load estimate for the diesel particulate filter when the restriction sensitivity is below a preset threshold.

18. The method of claim 17, wherein the restriction sensitivity is determined within the ECM using:

$$RS = \frac{R_1 - R_2}{DPSLE_1 - DPSLE_2}$$

wherein $R_1$ is a restriction within the diesel particulate filter at the first time, $R_2$ is a restriction within the diesel particulate filter at the second time, $DPSLE_1$ is the first soot load estimate, and $DPSLE_2$ is the second soot load estimate.

19. The method of claim 17, wherein restriction within the diesel particulate filter is determined using:

$$R = \frac{\Delta P \text{ of Exhaust Gas Particulate Filter}}{\text{Volumetric Flow Rate of Engine Exhaust}}$$

wherein ΔP of Exhaust Gas Particulate Filter is pressure change from the input to the output of the diesel particulate filter.

20. The method of claim 17 further comprising:
continuing within the ECM the use of the first soot load estimate and the second soot load estimate when the restriction sensitivity remains above a preset threshold.

21. The method of claim 17 further comprising:
selecting within the ECM the first soot load estimate for the diesel particulate filter when temperature of the diesel particulate filter is not within a predetermined temperature range.

22. The method of claim 17 further comprising:
selecting within the ECM the first soot load estimate for the diesel particulate filter when the volumetric flow rate of the exhaust gas is not within a predetermined threshold range.

23. The method of claim 17, wherein the restriction sensitivity is determined by a ratio of difference between restriction at the first time and restriction at the second time, and difference between the first soot load estimate and the second soot load estimate.

24. The method of claim 17, wherein restriction within the diesel particulate filter is determined by a ratio of pressure change from the input to the output of the diesel particulate filter and the volumetric flow rate of engine exhaust.

* * * * *